S. WOLFF.
Millstone Dress.
No. 20,462.
Patented June 1, 1858.
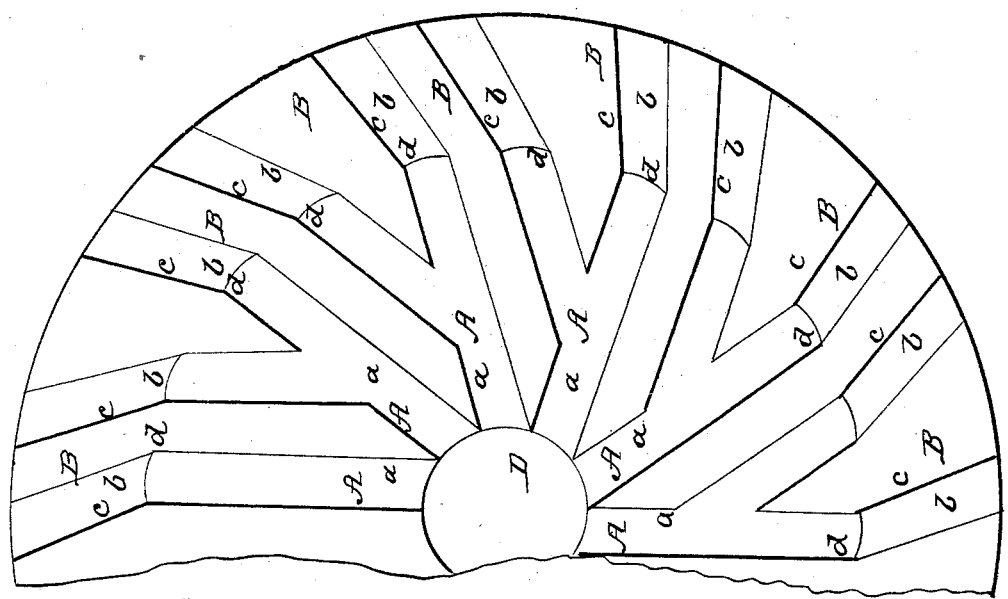
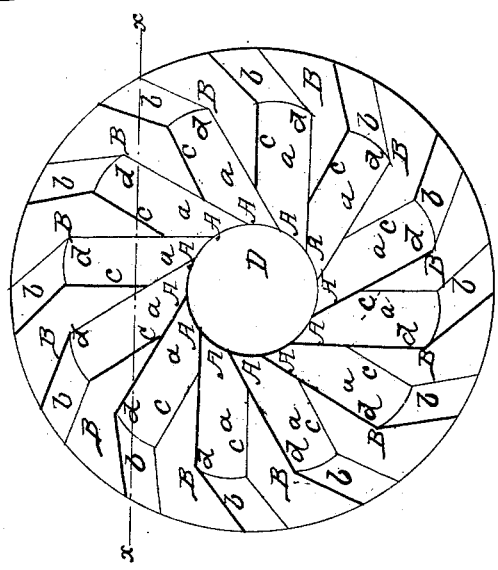
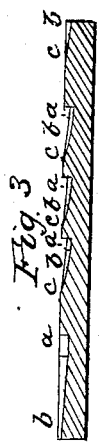

UNITED STATES PATENT OFFICE.

S. WOLFF, OF VICKSBURG, MISSISSIPPI.

MILLSTONE-DRESS.

Specification of Letters Patent No. 20,462, dated June 1, 1858.

*To all whom it may concern:*

Be it known that I, SAMSON WOLFF, of Vicksburg, in the county of Warren and State of Mississippi, have invented a new and useful Improvement in Millstone-Dress; and I do hereby declare that the following is a full, clear, and exact description of the same, reference being had to the accompanying drawings, forming a part of this specification in which—

Figure 1, is a plan of a mill stone dressed after my invention. Fig. 2, is a side or edge view of the same. Fig. 3, is a vertical section in the line $x, x,$ of Fig. 1. Fig. 4, shows the manner of dressing very large stones when my improvement is adopted.

Similar letters of reference in each of the several figures indicate corresponding parts.

The nature of my invention consists in dressing mill stones with elbow shaped furrows A, B, which are partly concave in their transverse section or curved as shown at $a$, and partly beveled in the same section as shown at $b$, and so constructed that all the feather edges $c, c,$ of the main furrows radiate from the center of the eye D, of the stone, and that the elbows $d, d,$ or commencement of the angles B is at a point nearer the circumference than the eye of the stone, as shown in the drawing. By thus giving the furrows a concave or curved form in their transverse section, from their commencement to their angle or elbows $d, d,$ they are made deeper and more roomy, and the grain is not liable to choke the action of the stones, and a rolling motion, which keeps the grain near the eye of the stones cool, is imparted to the grain. And by giving the furrows a bevel form in their transverse section from their elbow or angle to the circumference of the stones, they are made shallower between these points, and consequently the draft is not so great and the discharge of particles of grain with the flour does not occur. And lastly by having the feather edge of all the main furrows radiate from the center, and the elbows or angle B, of said furrows commence at a point which is about two thirds of the distance from the eye to the circumference of the stones, the width and length of the furrows, from the eye of the stone to the elbows, are increased, and the draft portion thereof decreased; and thus the attainment of the above results rendered more certain, as the furrows when made with radial feather edges and short angular draft portions supply the grain to a greater length of grinding surface, between which it is retained longer than when the feather edges are tangential, and the elbows or commencement of the angle of the furrows is at a point midway between the eye and the circumference of the stone.

What I claim as my invention and desire to secure by Letters Patent, is—

Dressing mill stones with elbow shaped furrows A, B, which are partly concave in their transverse section or curved, as shown at $a;$ and partly beveled in the same section as shown at $b,$ and so constructed that all the feather edges $c, c,$ of the main furrows radiate from the center of the eye B, of the stone, and that the elbows $d, d,$ or commencement of the angles is at a point nearer the circumference than the eye of the stone, substantially as and for the purposes set forth.

The above specification of my improvement in mill stone dress signed by me this 8th day of May 1858.

SAMSON WOLFF.

Witnesses:
G. YORKE ATLEE,
H. W. FENWICK.